United States Patent [19]
Holuigue et al.

[11] Patent Number: 5,214,667
[45] Date of Patent: May 25, 1993

[54] PROCESS AND APPARATUS FOR GRAPHITIZING CARBON BODIES

[75] Inventors: Claude Holuigue, le Fayet, France; Heinrich Panholzer, Linz, Austria

[73] Assignee: Voest-Alpine Machinery, Construction & Engineering Gesellschaft m.b.H., Linz, Austria

[21] Appl. No.: 706,889

[22] Filed: May 29, 1991

[30] Foreign Application Priority Data

May 31, 1990 [AT] Austria ............................. 1180/90

[51] Int. Cl.⁵ ........................... H05B 3/00; F27B 9/14
[52] U.S. Cl. ..................................... 373/120; 432/239
[58] Field of Search ............. 373/120, 109, 122, 125, 373/126; 432/239, 125, 126, 77; 264/27, 29.5, 29.6, 29.7

[56] References Cited

U.S. PATENT DOCUMENTS

| | | | |
|---|---|---|---|
| 1,743,888 | 1/1930 | Hamister | 373/88 |
| 3,284,372 | 11/1966 | Bailey | 264/29.7 |
| 4,017,673 | 4/1977 | Michels et al. | 373/120 |
| 4,639,929 | 1/1987 | Bernard et al. | 373/120 |
| 4,956,849 | 9/1990 | Holuigue et al. | 373/120 |

FOREIGN PATENT DOCUMENTS

| | | |
|---|---|---|
| 311538 | 4/1989 | European Pat. Off. |
| 2185559 | 7/1987 | United Kingdom |
| 9118250 | 11/1991 | World Int. Prop. O. |

Primary Examiner—Bruce A. Reynolds
Assistant Examiner—John A. Jeffery
Attorney, Agent, or Firm—Collard & Roe

[57] ABSTRACT

Carbon bodies to be graphitized are clamped together in a horizontal train, in which adjacent end faces of said bodies adjoin each other, and are heated by a flow of electric current in a graphitizing zone and subsequently cooled in a cooling zone. Individual carbon bodies are added to the train at the entrance of the graphitizing furnace and individual carbon bodies which have been graphitized are removed from the train at the exit of the furnace. To ensure a desirable handling of the train in the furnace, the train being moved through the graphitizing furnace is moved at least in a portion of the cooling zone through a bed of carbonaceous bulk material and outside said bed of bulk material is moved in said furnace through a protective gas atmosphere and the train is held to be self-supporting at least in the graphitizing zone between the furnace electrodes.

18 Claims, 3 Drawing Sheets

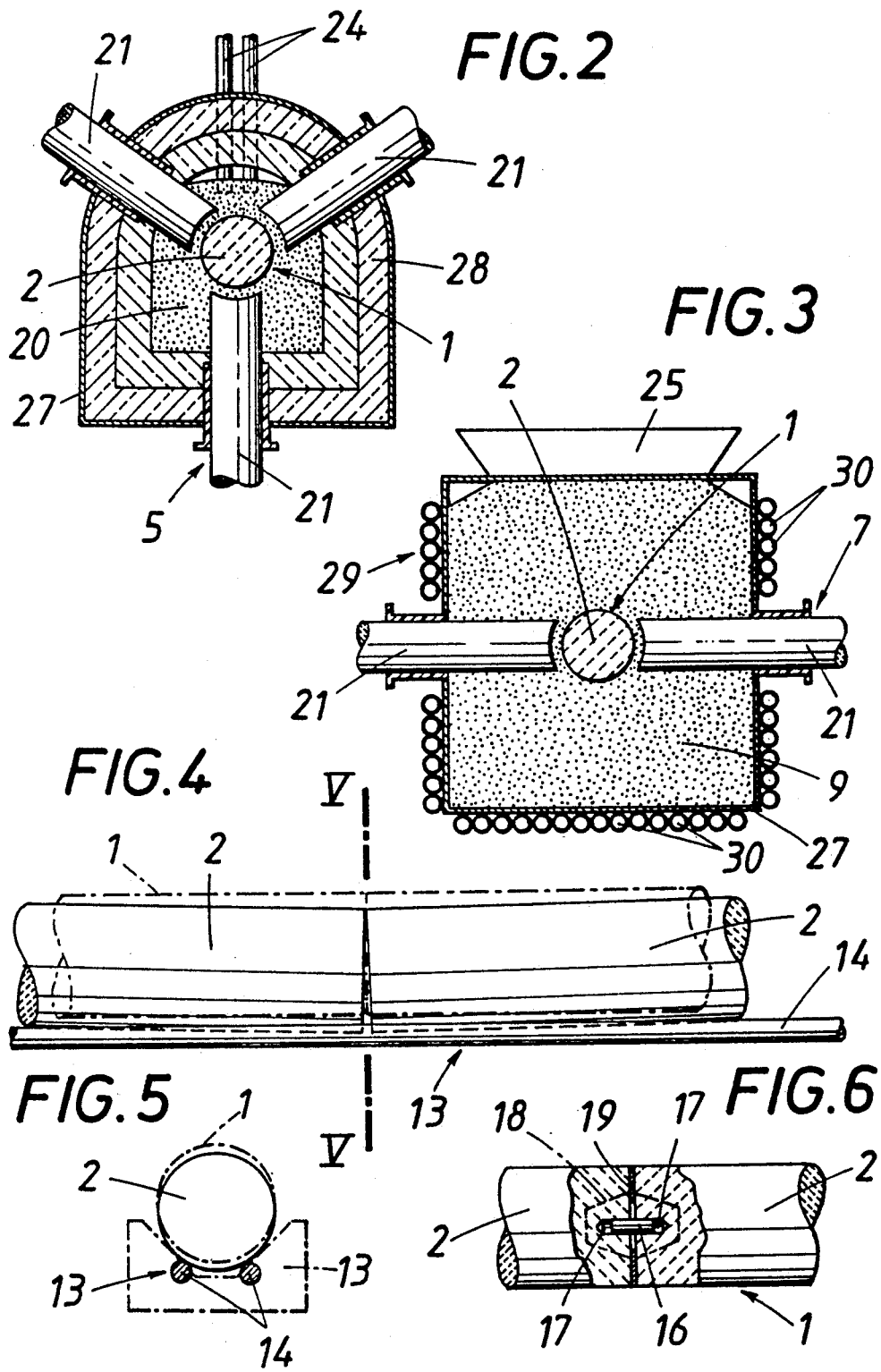

PROCESS AND APPARATUS FOR GRAPHITIZING CARBON BODIES

BACKGROUND OF THE INVENTION

1. Field of the Invention

This invention relates to a process of graphitizing carbon bodies, which are arranged with adjacent end faces of said carbon bodies adjoining each other and are clamped together to form a horizontal train, which is moved through a graphitizing furnace, in which the train is heated by a supply of electric current in a graphitizing zone and is subsequently cooled in a cooling zone. In dependence on the movement of said train through the graphitizing furnace, the train is continually supplemented at the entrance of the furnace in that individual carbon bodies are added to the train, and is continually shortened at the exit of the furnace in that individual carbon bodies are removed from the train. The invention relates also to an apparatus for carrying out the process.

2. Description of the Prior Art

Prefired carbon bodies which are to be graphitized are assembled in a train, in which adjacent end faces of the carbon bodies adjoin each other, and in said train are heated to the required graphitizing temperature by means of electric current which is caused to flow through a length portion of the train. In order to ensure that the graphitizing process can continuously be performed, the train is conveyed through a graphitizing furnace in conveying steps and after each conveying step a carbon body to be graphitized is added to the train at the entrance of the furnace and a graphitized carbon body is removed from the train at the same time at the exit of the furnace. Graphitizing furnaces which are particularly suitable for such a continuous graphitization of carbon bodies which engage each other at adjoining end faces have a horizontal furnace axis although this requires that the horizontally moving train is properly supported. For that purpose it is known to fill the graphitizing furnace with carbonaceous bulk material, such as coke or soot, which will provide the necessary support for the train of carbon bodies and will also avoid the presence of an oxidizing atmosphere in the furnace. But the use of such bulk material has the disadvantage that it must necessarily be heated in the graphitizing zone together with carbon bodies which are to be graphitized so that more energy will be required. Besides, a temperature rise of the carbonaceous bulk material will improve its electrical conductivity so that creepage currents conducted parallel to the train may occur.

In order to avoid said disadvantages it has already been proposed (Austrian Patent Specification 389,506 and the corresponding U.S. Pat. No. 4,956,849) not to fill the graphitizing furnace with carbonaceous bulk material but to provide in the graphitizing furnace a protective gas atmosphere and to axially clamp the train sufficiently to render it self-supporting. Whereas that measure will avoid the disadvantages involved in the use of carbonaceous bulk material filling the furnace, it will be necessary in that case to exert on the train considerable clamping forces in order to render the train self-supporting and the required magnitude of said clamping forces will depend on the length of the train and must even be maintained as a new carbon body is added to the train and a graphitized carbon body is removed from the train so that the structural expenditure will additionally be increased.

SUMMARY OF THE INVENTION

It is an object of the invention to provide for the graphitizing of carbon bodies a process which is of the kind described first hereinbefore and which is so improved that the advantages of the graphitizing under a protective gas atmosphere can be utilized whereas the expenditure involved therein according to the prior art will be avoided.

That object is accomplished in accordance with the invention in that the train being moved through the graphitizing furnace is moved at least in a portion of the cooling zone through a bed of carbonaceous bulk material and outside said bed of bulk material is moved in said furnace through a protective gas atmosphere and the train is held to be self-supporting at least in the graphitizing zone between the furnace electrodes.

Because the graphitizing furnace is filled in part with a carbonaceous bulk material, said bulk material can desirably be utilized for supporting the horizontal train of carbon bodies adjoining at their end faces so that the magnitude of the axial clamping forces required to render the train self-supporting will considerably be decreased. As a result, the expenditure required to exert the gripping forces will be reduced and it will be possible to increase the length of the train for a predetermined axial loading. Because the bulk material is provided in the graphitizing furnace in the cooling zone, those disadvantages will be avoided which are involved in the presence of such bulk material in the graphitizing zone and which reside in that the bulk material will be heated together with the carbon bodies to be graphitized and in that creepage currents flowing parallel to the train may occur. This is due to the fact that a protective gas atmosphere is now provided in the graphitizing zone of the furnace so that the advantages afforded by the use of bulk material and those afforded by the use of a protective gas atmosphere will be utilized whereas their disadvantages will be avoided.

The provision of carbonaceous bulk material in the cooling zone of the furnace may also be utilized for an improved cooling of the train, for instance, in that the train is moved in the cooling zone initially through a section which contains the bulk material and the train is moved near the exit through a section which contains a protective gas atmosphere. That measure will have the result that when the train has moved through the graphitizing zone heat will initially be dissipated from the train mainly by a conduction of heat rather than by radiation, as would be the case in a protective gas atmosphere. At the high temperatures which are present immediately after the graphitizing zone the conduction of heat through the bulk material will be less than the radiation of heat so that the cooling action will be reduced, as is desirable until the temperature of the carbon bodies has been decreased to a level which is sufficiently low to permit faster cooling in a protective gas atmosphere without an adverse effect on the quality of the graphitized carbon bodies. Whereas in a lower temperature range the dissipation of heat by a conduction of heat will be more effective than the dissipation of heat by a radiation of heat, the graphitized carbon bodies are taken from the furnace at a temperature above that range in general practice.

To assist the handling of the train while it is self-supporting the carbon bodies may be connected at their adjoining end faces by axial plugs or screws so that a radial offset between adjacent carbon bodies will effectively be prevented. That connection between adjoining end faces of carbon bodies in the train will not only permit a further decrease of the axial compressive forces required to clamp the train so that it will be self-supporting as it is moved outside the bulk material but will desirably permit an at least partial relief of the train from said axial compressive forces when carbon bodies are to be added to and removed from the train. This result will particularly be obtained if the train is self-supporting in a length of two or, at most, three carbon bodies.

But in addition to or instead of a provision of means connecting the carbon bodies at adjoining end faces it is possible to support the normally self-supporting portion of the train when it has been relieved from the axial compressive forces and an excessive sagging or a collapsing of the train must be avoided. It is necessary to ensure that the carbon bodies will be forced back to provide a straight train when axial forces are re-exerted on a train which has sagged. If the carbon bodies have been forced out of alignment only to a small extent from the positions corresponding to a straight train, that desired result will be produced even when means for axially connecting adjacent carbon bodies are not provided and in that case it will not be necessary to provide supporting means which can be raised and lowered and serve to support the normally self-supporting portion of the train in the furnace, although such means may also be provided. But it will be sufficient to ensure that the carbon bodies of the normally self-supporting portion of the train can be supported by at least one support, which is provided under the normally self-supporting portion of the train and with said portion defines a clearance which is sufficient to permit a frictionless movement of the self-supporting portion of the train past the support. In that case a decrease of the axial compressive forces acting on the train will have the result that the carbon bodies are downwardly deflected only slightly until then engage the support. The clearance is only required to permit the self-supporting train to be moved without friction.

It will be understood that the nature and number of the supports will depend on the number and size of the carbon bodies which are to be supported and will thus depend on the length of path along which the train is moved while it is self-supporting; that path will mainly extend between the electrode contact points to ensure a proper flow of current. The electrodes may also be used to support the train and the distance between the electrode contact points will be of decisive significance for the selection of the means for supporting the train between the electrode contact points. It will be possible to support the train in a particularly desirable manner if the distance between the electrode contact points is not in excess of the total length of two carbon bodies because it will be sufficient in that case to support only one carbon body, at most, between the carbon bodies which are supported by the electrodes.

Any connecting plugs or screws which are employed will not adversely affect the flow of current in the train because the conduction of current in the outer layers of the carbon bodies will be sufficient for establishing the required current value. But the dowels or screws should not adversely affect the integrity of the train material. For this reason it is recommended to connect adjacent carbon bodies of the train by axial plugs or screws consisting of carbon which is reinforced by carbon fibers, which ensure that said carbon has the required strength properties. Because the means by which the carbon bodies are axially connected are generally disposed adjacent to recesses which will be formed in the graphite electrodes to be made from the carbon bodies and receive corresponding electrode holders, the provision of the bores for receiving the plugs or screws used as axial connecting means will not result in a loss of material in the graphite electrodes.

The process can be carried out by means of a graphitizing furnace which contains a graphitizing zone that is provided with at least two electrodes for supporting a train of carbon bodies. In the direction of movement of the train through the furnace the graphitizing zone is succeeded by a cooling zone. The furnace is also provided with a conveyor, which serves to convey the train and comprises two gripping heads, which are respectively disposed before and behind the graphitizing furnace and adapted to clamp the train between them and are adjustable along the axis of the furnace. Such arrangements are known in connection with furnaces which contain a protective gas atmosphere and in which the train is self-supporting while the train is moved through said furnace in said protective gas atmosphere. If such a graphitizing furnace contains at least in a part of the cooling zone a bed of carbonaceous bulk material and contains outside said bed of bulk material and particularly in the graphitizing zone a protective gas atmosphere, the desired handling of the train in such graphitizing furnace can easily be ensured because the train is additionally supported by the bed of bulk material in the cooling zone and the graphitizing will be effected while the train is self-supporting and exposed to a protective gas atmosphere. For this reason the gripping heads for axially gripping the train may be lighter in weight and less expensive, particularly if the carbon bodies of the train are interconnected at their adjoining end faces by axial plugs or screws, which establish a positive connection so that a radial offsetting of the carbon bodies will reliably be precluded even if the clamping forces are relatively weak.

In addition to the provision of means for connecting carbon bodies at their adjoining end faces or, under certain circumstances, also instead of the provision of such means, it is possible to provide means for supporting the train when it has buckled and for defining a clearance with an unbuckled train between the electrodes in the graphitizing zone so that upon a relief of the train by the gripping heads any buckling of the train of carbon bodies will be limited to such an extent that the carbon bodies will be forced back to their positions corresponding to a straight train when the clamping forces are re-exerted.

The support of the train should be independent of the instantaneous positions of the several carbon bodies of the train. This can be achieved in that the supports consist of two bars, which extend on opposite sides of and parallel to the path for the train and which also transversely center the train in a manner which may otherwise be effected by supports formed with a V-shaped recess for receiving the carbon bodies.

The bed of carbonaceous bulk material with which the cooling zone of the graphitizing furnace is filled in part can desirably be utilized to control the cooling rate of the carbon bodies, for instance, if the cooling zone has adjacent to the graphitizing zone a part which contains such bulk material and which is succeeded by a cooling zone part which contains a protective gas atmosphere. At a relatively high temperature the bed of carbonaceous bulk material will decrease the rate of heat dissipation compared to the rate of heat radiation in a protective gas atmosphere so that graphitized carbon bodies of higher quality can be produced. Only after the carbon bodies have been cooled to a certain temperature level will the carbon bodies not be deteriorated when they are cooled at a higher rate in a protective gas atmosphere. For this reason it will be necessary to determine the length of the bed of bulk material in the cooling zone in dependence on the desired progress of the cooling.

BRIEF DESCRIPTION OF THE DRAWING

FIG. 2 is an enlarged transverse sectional view taken on line II—II in FIG. 1.

FIG. 3 is an enlarged sectional view taken on line III—III in FIG. 1.

FIG. 4 is a side elevation showing on a larger scale the design of means which may be used to support the normally self-supporting portion of the train of carbon bodies when it has buckled.

FIG. 5 is a sectional view taken on line V—V in FIG. 4.

FIG. 6 is a side elevation showing two adjoining carbon bodies of the train, which are torn open at the joint provided between them and are connected by a plug joint between adjoining end faces.

DETAILED DESCRIPTION OF THE PREFERRED EMBODIMENTS

Figure 1:
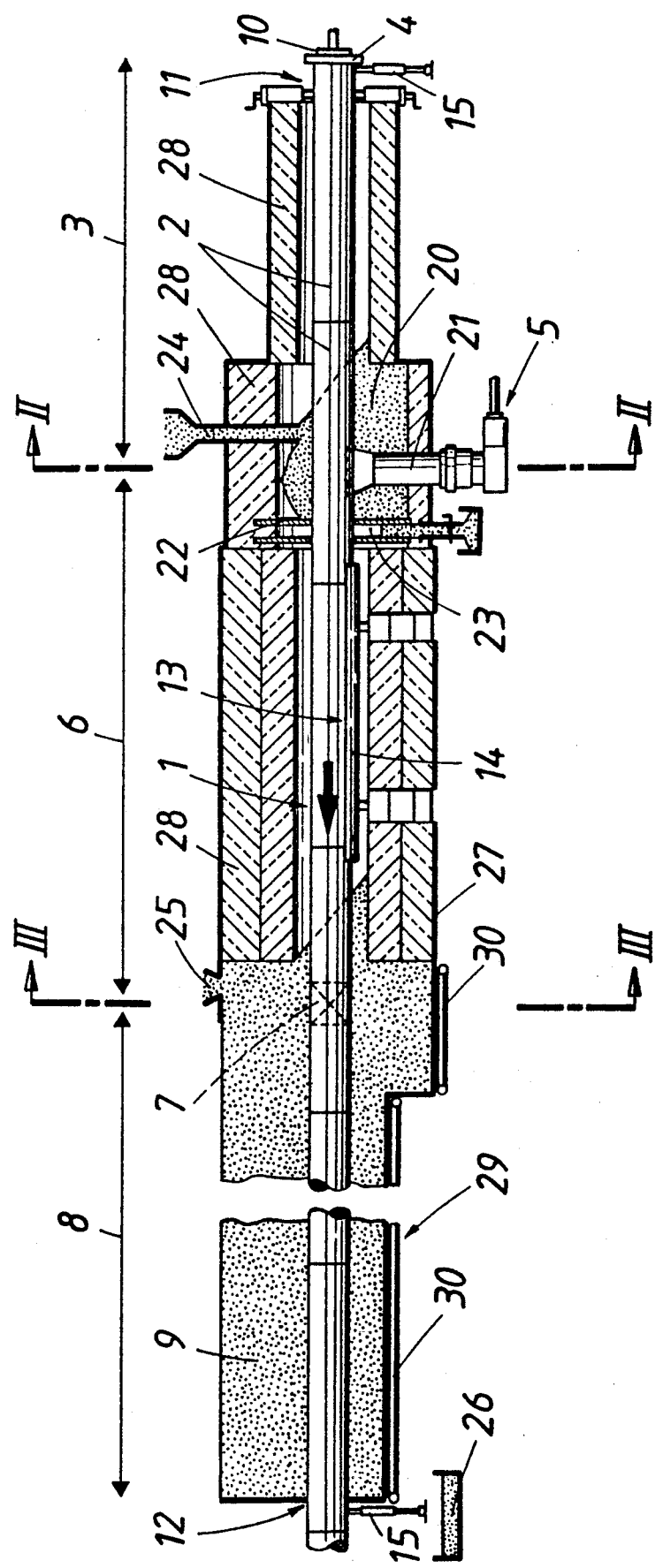
FIG. 1 is a diagrammatic longitudinal sectional view showing a graphitizing furnace in accordance with the invention.

The process in accordance with the invention will now be explained more in detail with reference to the drawing.

With reference to FIG. 1, carbon bodies 2 to be graphitized are axially clamped together to form a horizontal train 1, which is moved through the graphitizing furnace, in which a preheating zone 3 between an electrode 4 and an electrode array 5, a graphitizing zone 6 between electrode arrays 5 and 7, and a cooling zone 8 succeed each other in the direction of travel of the train 1 along a predetermined axial path. The graphitizing furnace contains a protective gas atmosphere in the preheating zone 3 and the graphitizing zone 6 and in the cooling zone 8 contains a bed consisting of a carbonaceous bulk material 9, such as coke or soot, for suitably supporting the train 1.

The carbon bodies 2 of the train 1 are moved in steps through the graphitizing furnace and for that purpose are first axially clamped together by and between two gripping heads, which are disposed outside the furnace adjacent to its entrance 11 and its exit 12, respectively. For the sake of clearness, only the gripping head 10 adjacent to the entrance 11 is shown. The axial compressive forces exerted on the train 1 by said gripping heads are sufficient to permit the train to be moved in steps between the electrodes 4 and 7 while it is self-supporting so that there is no need for a radial support of the train as it is moved in the preheating zone 3 and between the train-supporting electrodes 5 and 7 in the graphitizing zone 6.

Between any two steps of the movement of the train, a carbon body 2 is added to the train 1 at the entrance 11 of the furnace and a carbon body is removed from the train at the exit 12 of the furnace. It is desired to accomplish that without a maintenance of the axial compressive forces which are required to ensure that the train will be self-supporting while it is moved between the train-supporting furnace electrodes. This is accomplished in that additional supporting means 13 are provided for supporting the train 1 while it is self-supporting and such means will prevent an excessive sagging or a collapsing of the train while carbon bodies are added to and removed from the train. In the embodiment shown in FIGS. 4 and 5 said supporting means 13 consist of two bars 14, which extend on opposite sides of and parallel to the path for the train 1 and extend with a clearance under the train 1 when it is straight, as is indicated in phantom. When the axial compressive forces have been decreased the carbon bodies 2 of the train 1 will be supported and transversely centered by the bars 14 so that an excessive sagging of the train will be prevented. It has been found in practice that a sagging of the train 1 will cause the carbon bodies 2 to be downwardly deflected so that a wedge-shaped gap will be formed between adjacent end faces of the carbon bodies and a renewed axial clamping of the train 1 will have the result that the carbon bodies 2 are forced back to such positions that the train will again be straight and can be moved without friction past the bars 14. The bars 14 indicated by solid lines may be tubular or massive and must obviously withstand the temperatures to be encountered and for this reason preferably consist of carbon, which may optionally be reinforced by carbon fibers. Instead of the bars 14, it is possible to provide supports 13 formed with V-shaped grooves for receiving the carbon bodies 2, as is indicated in phantom in FIG. 5. Outside the graphitizing furnace the carbon bodies 2 are preferably supported by supports 15 which can be raised and lowered, e.g., by means of lazy tongs.

Because additional supporting means 13 are desirably avoided particularly in the graphitizing zone 6 or, at least a radial offset of the axially adjoining carbon bodies 2 is to be avoided, it is recommended to connect adjoining end faces of the carbon bodies 2 by plugs 16, such as are shown in FIG. 6, or by corresponding screws. The plugs 16 are preferably made of carbon, which is reinforced by carbon fibers, and are inserted into blind bores 17 formed in the end faces of the carbon bodies 2. Because the graphitized carbon bodies 2 are generally intended to be used as graphite electrodes, which are formed in their end faces with recesses 18 for receiving electrode holders, the provision of such plugs or screws will usually not involve a loss of material because such plugs or screws are mounted in the carbon body in a portion which in the graphite electrode will be formed with the recess 18. The current-conducting contact between the carbon bodies 2 outside the plugs 16 will be sufficient for providing an adequate current flow, particularly if an annular contact layer 19 of a material having a higher electrical conductivity than the material of the carbon bodies 2 is provided between adjoining end faces of the carbon bodies 2. The furnace electrode 4 provided adjacent to the entrance 11 of the furnace may be constituted by an electrode plate, which is forced by the gripping head 10 against the trailing end face of the train 1. The electrode arrays 5 and 7 must be designed and arranged to permit a movement of the train 1 relative to such electrode arrays. For that reason a bed 20 of carbonaceous bulk material is provided adjacent to the electrode arrays 5 and 7 and adjacent to the electrode array 7 that bed of bulk material may be constituted by the bed 9 of bulk material provided in the cooling zone. That bed 20 of bulk material is provided only along a portion of the length of the train 1 and will ensure the required contact between the electrodes 21 and the train 1 but will not adversely affect the movement of the train 1 relative to the stationary electrodes 21. The bed 20 is limited in the direction of travel of the train 1 by a partition 22 and any bulk material which is entrained by the train 1 through the partition 22 will be collected in a succeeding chamber 23 so that the succeeding graphitizing zone 6, which contains a protective gas atmosphere, will be free of bulk material. The bed 9 of bulk material in the cooling zone 8 and the bed 20 of bulk material adjacent to the electrode array 5 are continuously replenished through feed ducts 24 and 25 so that the losses of entrained bulk material will be compensated. A collecting vessel for collecting the bulk material which has been entrained out of the cooling zone 8 is indicated at 26.

The train 1 which is conveyed through the graphitizing furnace is preheated in the preheating zone 3 between the electrodes 4 and 5 and is subsequently heated to the required graphitizing temperature between the electrode arrays 5 and 7 in the graphitizing zone 6. In order to minimize the heat losses, the furnace housing 27 is provided with a suitable heat insulation 28 adjacent to said zones. On the other hand, a heat dissipation from the cooling zone 8 through the furnace housing 27 is desired and for this reason the furnace is provided adjacent to the cooling zone 8 with means for dissipating heat from the bed 9 of bulk material and with means 29 for cooling the housing 27. The cooling means 29 comprise cooling pipes 30, which are flown through by a cooling fluid, as is particularly apparent from FIG. 3.

When it is desired to add a carbon body 2 which is to be graphitized to the train 1 at its trailing end and to remove a graphitized carbon body 2 from the train 1 at its leading end, the gripping heads 10 are disengaged from the train 1 and the train 1 will then be supported by the bed 9 of bluk material in the cooling zone, by the bed 20 of bulk material adjacent to the electrode array 5 and by the supports 15 outside the graphitizing furnace when said supports have been engaged with the train 1 before it has been relieved from the axial compressive forces. Particularly if the carbon bodies 2 are interconnected at adjoining end faces by plugs 16 or screws, that support of the train may be sufficient to keep any sag of the train 1 in a permissible range and to ensure that upon the re-exertion of the axial compressive forces the carbon bodies 2 can again be moved as a straight train through the graphitizing furnace so that additional means for supporting the train while it is self-supporting, particularly in the graphitizing zone 6, will not be required. Otherwise, additional means 13 for supporting the normally self-supporting portion of the train 1, mainly in the graphitizing zone 6, will be required, and such additional supporting means 13 should ensure that the sagging of the normally self-supporting portion of the train will be restricted to a permissible extent whereas the movement of the self-supporting train 1 will not adversely be affected in that region. As a result, the advantages afforded by the use of a protective gas atmosphere adjacent to the current-conducting portions of the train and the advantages afforded by the provision of a bed 9 of bulk material in the cooling zone may be utilized whereas the disadvantages which would be involved in the provision of a protective gas atmosphere in the cooling zone and those involved in the provision of a bed of bulk material in the graphitizing zone will be avoided.

Figure 7:
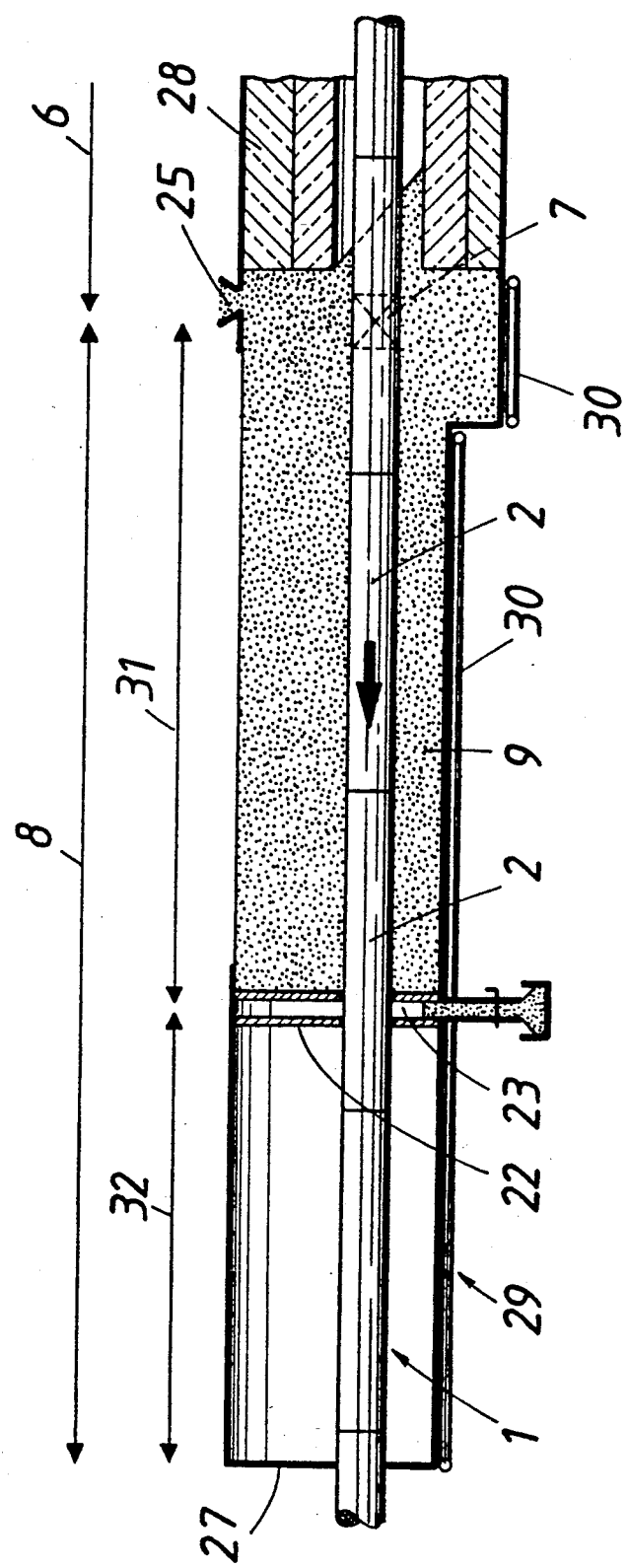
FIG. 7 is a longitudinal sectional view showing a cooling zone of the graphitizing furnace in a modification of FIG. 1.

As is apparent from FIG. 7 the cooling zone 8 may be provided with a bed 9 of bulk material only in a part 31 which is adjacent to the graphitizing zone 6 so that the cooling of the graphitized carbon bodies will proceed in a desirable manner. In the illustrative embodiment shown in FIG. 7 the fact is utilized that at relatively high temperatures the dissipation of heat by a conduction of heat through the bed 9 of bulk material is slower than the dissipation of heat by a radiation of heat so that in a region in which the temperatures are high the cooling rate will be kept within the range in which the quality of the graphitized carbon bodies will not be deteriorated by such cooling. When the temperature has been reduced to a certain level, a faster cooling will be permissible without a deterioration. That faster cooling will be effected by a radiation of heat in a protective gas atmosphere in a succeeding part 32 of the cooling zone 8. The parts 31 and 32 are separated by another partition 22, which is succeeded by a chamber 23 for collecting entrained bulk material.

We claim:

1. In a process of graphitizing carbon bodies in a graphitizing furnace having an entrance, an exit, a graphitizing zone between said entrance and said exit, and a cooling zone between said graphitizing zone and said exit, which process comprises clamping a plurality of carbon bodies together to form a horizontally extending train, in which adjacent end faces of said carbon bodies adjoin each other, longitudinally moving said train in said graphitizing furnace from said entrance through said graphitizing zone and subsequently through said cooling zone to said exit, causing electric current to flow in said train in said graphitizing zone to heat said train, subsequently cooling said train in said cooling zone, and adding from time to time a new carbon body to said train at its trailing end at said entrance and removing from time to time a carbon body from the leading end of said train at said exit, the improvement residing in that a bed of carbonaceous bulk material is maintained in said graphitizing furnace in at least part of said cooling zone, a protective gas atmosphere is maintained in said graphitizing furnace outside said bed of carbonaceous bulk material, said train is moved in said furnace through said bed of carbonaceous bulk material and through said protective gas atmosphere, furnace electrodes are provided in said furnace in said graphitizing zone to contact said train at two electrode contact points spaced apart along said train, and said train is held to be self-supporting between said electrodes as it is moved in said graphitizing zone.

2. The improvement set forth in claim 1, wherein said bed of carbonaceous bulk material is maintained in said cooling zone in a part thereof which is adjacent to said graphitizing zone, said protective gas atmosphere is maintained in said cooling zone between said bed of carbonaceous bulk material and said exit, and said train is moved in said cooling zone first through said bed of carbonaceous material and thereafter through said protective gas atmosphere.

3. The improvement set forth in claim 1, wherein said carbon bodies are connected at adjoining end faces by axially extending connecting means in assembling said train.

4. The improvement set forth in claim 3, wherein said connecting means consist of plugs.

5. The improvement set forth in claim 3, wherein said connecting means consist of screws.

6. The improvement set forth in claim 3, wherein said axially extending connecting means consist of carbon reinforced by carbon fibers.

7. The improvement set forth in claim 3, wherein a layer of a material which has a higher electrical conductivity than the material of said carbon bodies is provided between said adjoining end faces of said carbon bodies of said train.

8. The improvement set forth in claim 1, wherein said train is supported by said furnace electrodes.

9. In a process of graphitizing carbon bodies in a graphitizing furnace having an entrance, an exit, a graphitizing zone between said entrance and said exit, and a cooling zone between said graphitizing zone and said exit, which process comprises clamping a plurality of carbon bodies together to form a horizontally extending train, in which adjacent end faces of said carbon bodies adjoin each other, longitudinally moving said train in said graphitizing furnace from said entrance through said graphitizing zone and subsequently through said cooling zone to said exit, causing electric current to flow in said train in said graphitizing zone to heat said train, subsequently cooling said train in said cooling zone, and adding from time to time a new carbon body to said train at its trailing end at said entrance and removing from time to time a carbon body from the leading end of said train at said exit, the improvement residing in that a bed of carbonaceous bulk material is maintained in said graphitizing furnace in at least part of said cooling zone, a protective gas atmosphere is maintained in said graphitizing furnace outside said bed of carbonaceous bulk material, said train is moved in said furnace through said bed of carbonaceous bulk material and through said protective gas atmosphere, furnace electrodes are provided in said furnace in said graphitizing zone to contact said train at two electrode contact points spaced apart along said train, said train is held to be self-supporting between said electrodes as it is moved in said graphitizing zone, axial compressive forces are exerted on said train to render said train self-supporting, and said train is relieved from said axial compressive forces before said new carbon body is added to said train and before a carbon body is removed from the leading end of said train.

10. The improvement set forth in claim 9, wherein said train is supported by supporting means in said graphitizing zone as said train is relieved from said axial compressive forces, and said train is held to be self-supporting by said axial compressive forces adjacent to said supporting means as said train is moved in said graphitizing zone.

11. The improvement set forth in claim 9, wherein said train is supported by said supporting means between said electrode contact points as said train is relieved from said axial compressive forces.

12. The improvement set forth in claim 9, wherein a clearance is maintained between said supporting means and said train when it is held to be self-supporting between said electrode contact points as it is moved in said graphitizing zone.

13. In an apparatus for graphitizing carbon bodies clamped together to form a horizontally extending train, in which adjacent end faces of said carbon bodies adjoin each other, which apparatus comprises a graphitizing furnace having an entrance, an exit, a graphitizing zone between said entrance and said exit, a cooling zone between said graphitizing zone and said exit, and furnace electrode means disposed in said graphitizing zone at two electrode contact points spaced apart along said graphitizing zone, and conveying means for longitudinally moving said train in said graphitizing furnace along a predetermined axial path from said entrance through said graphitizing zone in simultaneous contact with said electrode means at both said electrode contact points and subsequently through said cooling zone to said exit, the improvement residing in that said furnace contains in at least part of said cooling zone a bed of carbonaceous material and is provided with means for maintaining a protective gas atmosphere in said furnace outside said bed of carbonaceous material, and said conveying means are operable to move said train in said furnace through said bed of carbonaceous material and through said protective gas atmosphere and to exert axial compressive forces on said train so as to hold said train to be self-supporting as it is moved in said graphitizing zone between said two electrode contact points.

14. The improvement set forth in claim 13, wherein said means for maintaining a protective gas atmosphere are operable to maintain said protective gas atmosphere in said graphitizing zone.

15. The improvement set forth in claim 13, wherein said conveying means comprise first and second gripping heads, which are disposed outside said furnace adjacent to said entrance and to said exit, respectively, and are movable relative to said furnace in the direction of said path and operable to clamp said carbon bodies together to form said train and to hold said train to be self-supporting as it is moved in said graphitizing zone between said two electrode contact points.

16. The improvement set forth in claim 13, wherein
said cooling zone has a part which is adjacent to said graphitizing zone and contains said bed of carbonaceous material and means are provided for maintaining a protective gas atmosphere in said furnace in said graphitizing zone and in said cooling zone between said bed of carbonaceous material and said exit.

17. In an apparatus for graphitizing carbon bodies clamped together to form a horizontally extending train, in which adjacent end faces of said carbon bodies adjoin each other, which apparatus comprises a graphitizing furnace having an entrance, an exit, a graphitizing zone between said entrance and said exit, a cooling zone between said graphitizing zone and said exit, and furnace electrode means disposed in said graphitizing zone at two electrode contact points spaced apart along said graphitizing zone, and conveying means for longitudinally moving said train in said graphitizing furnace along a predetermined axial path from said entrance through said graphitizing zone in simultaneous contact with said electrode means at both said electrode contact points and subsequently through said cooling zone to said exit, the improvement residing in that said furnace contains in at least part of said cooling zone a bed of carbonaceous material and is provided with means for maintaining a protective gas atmosphere in said furnace outside said bed of carbonaceous material, said conveying means are operable to move said train in said furnace through said bed of carbonaceous material and through said protective gas atmosphere and to exert axial compressive forces on said train so as to hold said train to be self-supporting as it is moved in said graphitizing zone between said two electrode contact points, said conveying means comprising first and second gripping heads disposed outside said furnace adjacent to said entrance and to said exit, respectively, and movable relative to said furnace in the direction of said path and operable to clamp said carbon bodies together to form said train and to hold said train to be self-supporting as it is moved in said graphitizing zone between said two electrode contact points, said gripping heads being operable to relieve said train from said axial compressive forces, and said furnace comprising supporting means for supporting said train in said graphitizing zone when said train is relieved from said axial compressive forces, said supporting means being arranged to define a clearance with said train as it is held to be self-supporting in said graphitizing zone.

18. The improvement set forth in claim 20, wherein said supporting means comprise two bars, which extend on opposite sides of and parallel to said path.

* * * * *